(12) United States Patent
Hoffman, Jr. et al.

(10) Patent No.: US 12,378,138 B2
(45) Date of Patent: Aug. 5, 2025

(54) CONTAMINANT-SEQUESTERING COATINGS AND METHODS OF USING THE SAME

(71) Applicant: The Johns Hopkins University, Baltimore, MD (US)

(72) Inventors: Christopher M. Hoffman, Jr., Odenton, MD (US); Zhiyong Xia, Rockville, MD (US); James K. Johnson, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 595 days.

(21) Appl. No.: 17/892,222

(22) Filed: Aug. 22, 2022

(65) Prior Publication Data

US 2023/0027521 A1    Jan. 26, 2023

Related U.S. Application Data

(63) Continuation-in-part of application No. 16/445,310, filed on Jun. 19, 2019, now Pat. No. 11,452,987.

(51) Int. Cl.
| | | |
|---|---|---|
| C02F 1/28 | (2023.01) |
| B01D 39/08 | (2006.01) |
| B01J 20/22 | (2006.01) |
| B01J 20/28 | (2006.01) |
| B01J 20/32 | (2006.01) |
| B01J 45/00 | (2006.01) |
| C02F 1/58 | (2023.01) |
| C02F 1/62 | (2023.01) |
| C02F 101/20 | (2006.01) |
| C02F 101/36 | (2006.01) |

(52) U.S. Cl.
CPC .............. *C02F 1/288* (2013.01); *C02F 1/583* (2013.01); *C02F 1/62* (2013.01); *C02F 2101/20* (2013.01); *C02F 2101/36* (2013.01)

(58) Field of Classification Search
None
See application file for complete search history.

(56) References Cited

U.S. PATENT DOCUMENTS

| | | |
|---|---|---|
| 3,882,153 A | 5/1975 | Seki et al. |
| 6,437,159 B1 | 8/2002 | Schultz |
| 6,518,442 B1 | 2/2003 | Felix et al. |
| 6,642,415 B1 | 11/2003 | Fuhrer et al. |
| 6,720,437 B2 | 4/2004 | Jones et al. |
| 6,865,939 B2 | 3/2005 | Kirby et al. |
| 7,011,696 B2 | 3/2006 | Ferrero et al. |
| 7,018,541 B2 | 3/2006 | Hintzer et al. |
| 7,351,342 B2 | 4/2008 | Funaki et al. |
| 7,404,907 B2 | 7/2008 | Welcker |

(Continued)

*Primary Examiner* — Daniel Berns
(74) *Attorney, Agent, or Firm* — Noah J. Hayward

(57) ABSTRACT

Contaminant-sequestering coatings include a network of hydrolyzed silane compounds including (i) a plurality of fluorinated functionalities, and (ii) a plurality of thiol functional groups are provided. The network of hydrolyzed silane compounds includes a fluorinated silane including (a) a hydrophilic polar head region. The polar head region includes one or multiple units of ethylene glycol (EG) functionality, (b) a fluorine-containing region, and (c) an anchor region including a silicon atom. The contaminant-sequestering coatings may sequester one or more per- and polyfluoroalkyl substances (PFAS), heavy metals, biological species, or any combination thereof.

18 Claims, 3 Drawing Sheets

(56) References Cited

U.S. PATENT DOCUMENTS

| | | |
|---|---|---|
| 7,795,332 B2 | 9/2010 | Hintzer et al. |
| 8,263,525 B1 | 9/2012 | Skandan et al. |
| 9,127,233 B2 | 9/2015 | Dietz |
| 9,284,201 B2 | 3/2016 | Kambala et al. |
| 9,308,501 B2 | 4/2016 | Hu et al. |
| 9,308,519 B2 | 4/2016 | Adachi et al. |
| 9,694,401 B2 | 7/2017 | Kerfoot |
| 9,725,384 B2 | 8/2017 | Elsheikh et al. |
| 2003/0098282 A1 | 5/2003 | Funaki et al. |
| 2004/0010156 A1 | 1/2004 | Kondo et al. |
| 2010/0000947 A1 | 1/2010 | Koizumi et al. |
| 2010/0084343 A1 | 4/2010 | Mader et al. |
| 2013/0200303 A1 | 8/2013 | Pancras et al. |
| 2013/0316433 A1 | 11/2013 | Huang |
| 2015/0053620 A1 | 2/2015 | Suri et al. |
| 2015/0252407 A1 | 9/2015 | Fu et al. |
| 2015/0360975 A1 | 12/2015 | Niu et al. |
| 2017/0203244 A1 | 7/2017 | Xia et al. |

CONTAMINANT-SEQUESTERING COATINGS AND METHODS OF USING THE SAME

CROSS-REFERENCE TO RELATED APPLICATIONS

This application is a continuation-in-part of prior-filed, co-pending U.S. Non-provisional application Ser. No. 16/445,310, filed Jun. 19, 2019, the content of which is herein incorporated by reference in its entirety.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Embodiments of the presently-disclosed invention relate generally to contaminant-sequestering coatings, methods of functionalizing a substrate surface with contaminant-sequestering functionalities (e.g., a surface functionalization technology that can be used on a variety of substrates), methods of removing contaminants from contaminant-containing liquids, and devices including a contaminant-sequestering coating.

BACKGROUND

Clean water is a vital resource for life. This need has been realized since ancient times where civilizations would emerge and settle near sources of clean water. With the growth of industrial, materials, and agrochemical production, the contamination of aquatic sources is becoming more prevalent worldwide. Many contaminants (sometimes irregularly referred to as "contaminates") have been reported in water, including pesticides, heavy metal ions, biological species, pharmaceutical residues, and per-, polyfluoroalkyl substances (PFAS). In particular, PFAS have emerged as an increasingly common contaminant in drinking water that are very difficult to remove and persist in the environment due to their unique structures.

PFAS are synthetic compounds with multiple C—F bonds that are used in industrial processes for the preparation of fire-resistant foams, protective coatings, and poly(tetrafluoroethylene) products. Perfluorooctane sulfonic acid (PFOS) and perfluorooctanoic acid (PFOA) are two eight-carbon PFAS that are widely found in water supplies. Both PFOS and PFOA are employed for a wide range of applications, including aqueous film-forming foams for firefighting, non-stick cookware, and water-resistant coatings for carpets, leather, and furniture. Due to the long human body accumulation times for PFOS (5.4 years) and PFOA (3.8 years), both chemicals have been linked to obesity, cancer, hormone disruption, and high cholesterol levels.

PFOS and PFOA may be introduced into the environment from the waste streams of industrial, military, or urban regions. The current state-of-the-art techniques for PFAS removal are adsorption on granular and powdered activated carbon, ion exchange resins, membrane filtration, and reverse osmosis. Of these approaches, adsorption on highly porous-activated carbon is the most commonly used method today; however, this approach is both nonselective for PFAS with known limitations in removing shorter chain PFAS and expensive to implement, which limits its application for large-scale filtration.

Therefore, there remains a need in the art for a technology that provides sequestering of PFAS, such as PFOS and PFOA to name a few, present in a liquid (e.g., water) source.

BRIEF SUMMARY

One or more non-limiting, example embodiments of the invention address one or more of the aforementioned problems. Certain embodiments according to the invention provide a contaminant-sequestering coating (e.g., in a dry and/or solid state) that comprises a network of hydrolyzed silane compounds including (i) a plurality of fluorinated functionalities, and (ii) a plurality of thiol functional groups. The network of hydrolyzed silane compounds may include a fluorinated silane comprising (a) a hydrophilic polar head region, wherein the polar head region comprises one or multiple units of ethylene glycol (EG) functionality, (b) a fluorine-containing region, and (c) an anchor region including a silicon atom.

In another aspect, certain embodiments of the invention provide a liquid composition comprising a flowable carrier medium and a plurality of hydrolyzable silane compounds including a plurality of thiol-functional silane compounds and a plurality of fluorinated silane compounds; wherein the plurality of fluorinated silane compounds include a at least one fluorinated silane compound comprises (a) a hydrophilic polar head region, wherein the polar head region comprises one or multiple units of ethylene glycol (EG) functionality, (b) a fluorine-containing region, and (c) an anchor region including a silicon atom.

In another aspect, certain embodiments of the invention provide a method of functionalizing a substrate surface with contaminant-sequestering functionalities. In accordance with certain embodiments of the invention, the method of functionalizing a substrate surface with contaminant-sequestering functionalities includes covering an inorganic substrate with a liquid composition including a plurality of hydrolyzable silane compounds that include a plurality of thiol functional groups, a plurality of fluorinated functionalities, or both. In accordance with certain embodiments of the invention, the method may further comprise hydrolyzing the plurality of hydrolyzable silane compounds to form a plurality of hydrolyzed silane compounds and allowing the hydrolyzed silane compounds to condense (e.g., condensation reaction between the plurality of hydrolyzed silane compounds) with each other and or with a substrate to form a contaminant-sequestering coating, in which the contaminant-sequestering coating comprises a network of the hydrolyzed silane compounds.

In another aspect, certain embodiments of the invention provide a device including an inorganic substrate and a contaminant-sequestering coating bonded to at least a portion of the substrate. The contaminant-sequestering coating (e.g., in a dry and/or solid state) may comprise a network of hydrolyzed silane compounds including (i) a plurality of fluorinated functionalities, and (ii) a plurality of thiol functional groups, and wherein the network of hydrolyzed silane compounds includes a fluorinated silane comprising (a) a hydrophilic polar head region, wherein the polar head region comprises one or multiple units of ethylene glycol (EG) functionality, (b) a fluorine-containing region, and (c) an anchor region including a silicon atom.

In yet another aspect, certain embodiments of the invention provide a method of removing contaminants from a contaminant-containing liquid, in which the methods include contacting the contaminant-containing liquid with a contaminant-sequestering coating. In accordance with certain embodiments of the invention, the method may comprise flowing the contaminant-containing liquid across or through a device, such as those described and disclosed herein. The device may comprise a contaminant-sequestering coating, such as those described and disclosed herein, bonded to at least a portion of a substrate (e.g., inorganic substrate). In this regard, the method further comprises contacting the contaminant-containing liquid with the contaminant-sequestering coating of the device.

BRIEF DESCRIPTION OF THE DRAWINGS

Non-limiting, example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Non-limiting, example embodiments of the invention will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to a contaminant-sequestering coating (e.g., in an aqueous state or solid state) that comprises a network of hydrolyzed silane compounds, in which the hydrolyzed silane compounds may include a plurality of thiol functional groups (e.g., hydrolyzed silane compounds including one or more thiol functional groups), a plurality of fluorinated functionalities (e.g., hydrolyzed silane compounds including one or more fluorine atoms), or both. The contaminant-sequestering coating may be deposited and/or bonded to a variety of substrates, such as inorganic substrates typically used in, for example, filtration media, ion-exchange resins, and packing materials. In accordance with certain embodiments of the invention, the network of hydrolyzed silane compounds having the plurality of thiol functional groups, the plurality of fluorinated functionalities, or both may beneficially sequester a large array of heavy metals and/or a large array of per- and polyfluoroalkyl substances (PFAS) (e.g., perfluorooctane sulfonic acid (PFOS) and perfluorooctanoic acid (PFOA)). Non-limiting examples of PFAS include perfluorohexanoic acid (PFHxA), perfluorononanoic acid (PFNA), perfluorohexanesulfonic acid (PFHxS), perfluoroheptanoic acid (PFHpA), Perfluorobutanesulfonic acid (PFBS), and GenX (e.g., a chemical process that uses 2,3,3,3-tetrafluoro-2-(heptafluoropropoxy)propanoic acid (FRD-903) and produces 2,3,3,3-tetrafluoro-2-(heptafluoropropoxy)propanoate (FRD-902) and heptafluoropropyl 1,2,2,2-tetrafluoroethyl ether (E1), in which the chemicals are used in products such as food packaging, paints, cleaning products, non-stick coatings, outdoor fabrics, and firefighting foam).

Figure 1:
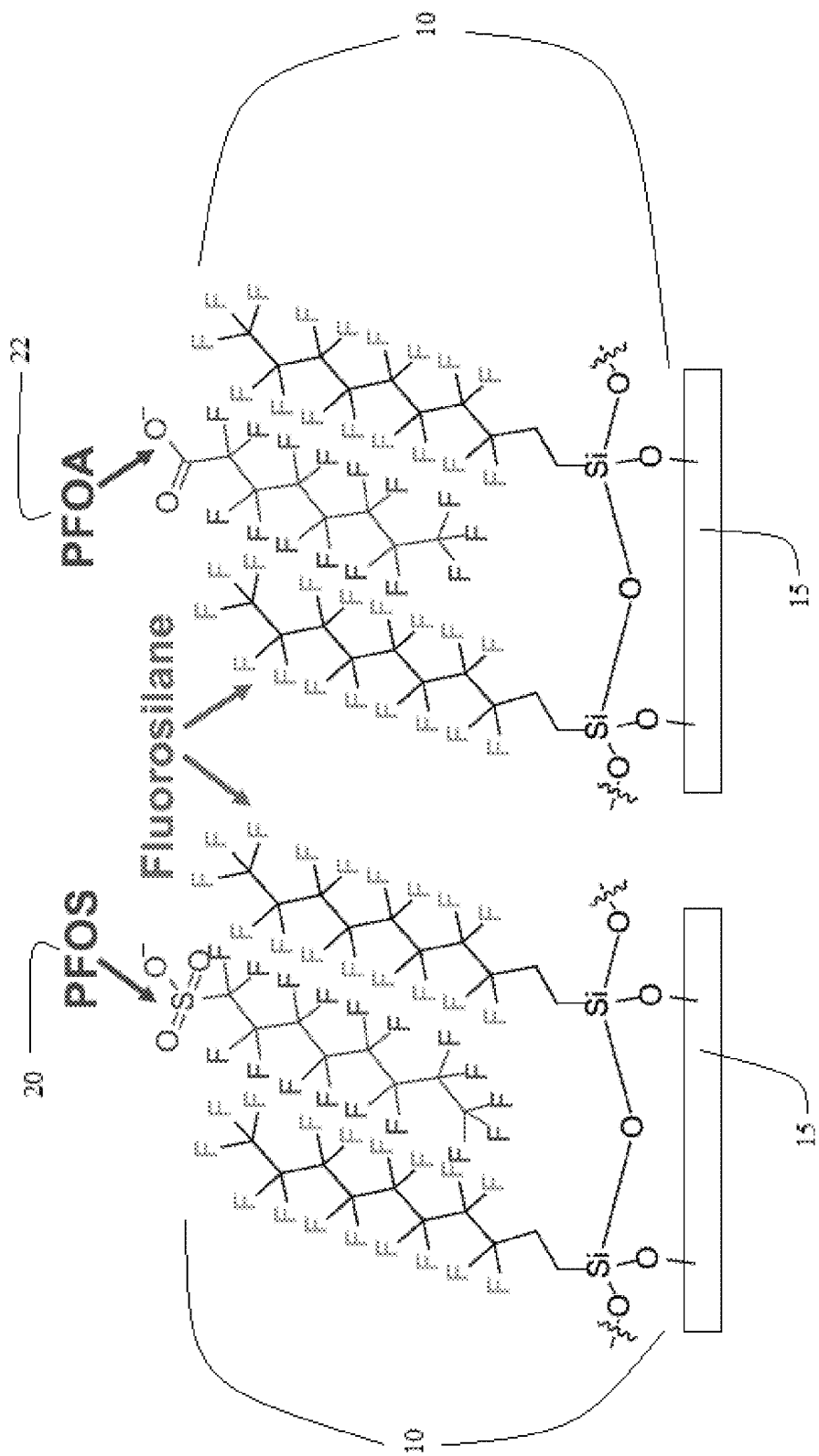
FIG. 1 illustrates a schematic representation of a silanized substrate having a network of hydrolyzed fluorosilanes sequestering/binding PFOA in accordance with certain embodiments of the invention.

In accordance with certain embodiments of the invention, the a contaminant-sequestering coating may sequester or remove from about 50% to about 100% by weight of one or more PFAS and/or one or more heavy metal, such as at least about any of the following: 50, 60, 70, and 80% of one or more PFAS and/or one or more heavy metal, and/or at most about any of the following: 100, 99, 98, 95, 90, 85, and 80% of one or more PFAS and/or one or more heavy metal. In accordance with certain embodiments of the invention, for example, the contaminant-sequestering coating may reduce the amount of one or more PFAS present in a water stream or source to at or below about 80 parts-per-trillion, such as at or below about 70 parts-per-trillion as recommended by the U.S. Environmental Protection Agency (EPA). By way of example only, FIG. 1 illustrates a schematic representation of a silanized substrate having a network of hydrolyzed fluorosilanes (e.g., having —Si—O—Si— linkers) sequestering/binding PFOA in accordance with certain embodiments of the invention. FIG. 1, for example, illustrates two (2) substrates 15 having a network of hydrolyzed fluorosilanes 10 bonded to the substrate. FIG. 1 also illustrates that PFOS 20 and PFOA 22 are sequestered and retained within the network of hydrolyzed fluorosilanes.

Certain embodiments according to the invention provide a contaminant-sequestering coating (e.g., in a dry and/or solid state) that comprises a network of hydrolyzed silane compounds including (i) a plurality of fluorinated functionalities, and (ii) a plurality of thiol functional groups. The network of hydrolyzed silane compounds may include a fluorinated silane comprising (a) a hydrophilic polar head region, wherein the polar head region comprises one or multiple units of ethylene glycol (EG) functionality, (b) a fluorine-containing region, and (c) an anchor region including a silicon atom.

In accordance with certain embodiments of the invention, the network of hydrolyzed silane compounds may be formed at least in part from a hydrolyzable thiol-functionalized silane compounds. In accordance with certain embodiments of the invention, the thiol-functional silane(s) may include one or more hydrolyzable group bonded to a silicon atom. For example, the hydrolyzable group(s) may independently comprise an alkoxy group, acyloxy group, an amine group, or chlorine. In accordance with certain embodiments of the invention, the hydrolyzable thiol-functional silane compounds may independently have a structure according to Formula (I):

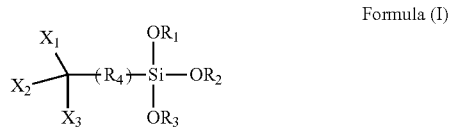

Formula (I)

wherein

—OR$_1$, —OR$_2$, and —OR$_3$ are each hydrolyzable groups;

R$_4$ is a saturated C$_1$-C$_{20}$ radical or an unsaturated C$_1$-C$_{20}$ radical; and X$_1$, X$_2$, and X$_3$ are each independently selected from —H, —SH, or a polar group such as one or more ethylene glycol (EG) units; wherein at least one of X$_1$, X$_2$, and X$_3$ is —SH.

In accordance with certain embodiments of the invention, R$_1$, R$_2$, and R$_3$ from Formula (I) may each be independently selected from a C$_1$-C$_4$ radical. In this regard, —OR$_1$, —OR$_2$, and —OR$_3$ may each comprise the same or different alkoxy groups, which are hydrolyzable to form reactive silanol groups that can condense with other silanol groups (e.g., from other hydrolyzed silane compounds and/or inorganic surfaces) to form condensation products (e.g., network of hydrolyzed silane compounds). In accordance with certain embodiment of the invention, the R$_4$ from Formula (I) may include at least one side chain including thiol functionality thereon. In accordance with certain embodiment of the invention, the R$_4$ from Formula (I) may include at least one heteroatom selected from oxygen, nitrogen, sulfur, phosphorus, or combinations thereof.

By way of example only, the network of hydrolyzed silane compounds may be formed from or comprise one of more of the following wherein 'n' may comprise a value from 1 to about 20:

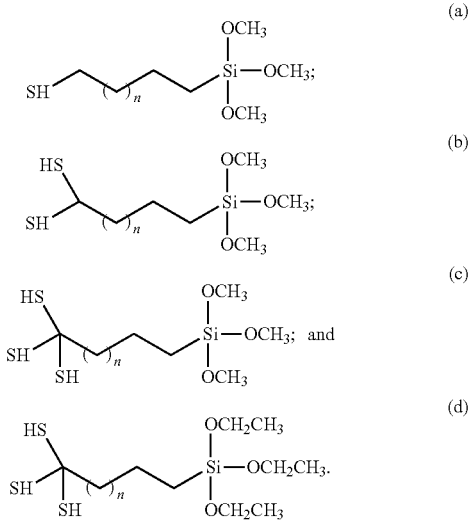

In accordance with certain embodiments of the invention, the contaminant sequestering coating comprises a network of hydrolyzed silane compounds including a plurality of fluorine atoms. For example, the network of hydrolyzed silane compounds may comprise one or more fluorinated silane compounds comprising a linear C$_1$-C$_{200}$ perfluorosilane, for example, a linear perfluorosilane or combinations thereof having from at least about any of the following: 1, 3, 5, 8, 10, 12, 15, 20, 25, 30, 40, 50, 60, 70, 80, 90, and 100 carbon atoms and/or at most about 200, 190, 180, 170, 160, 150, 140, 130, 120, 110, 100, and 80 carbon atoms. In accordance with certain embodiments of the invention, for example, the network of hydrolyzed silane compounds may be formed from or comprise a plurality of different perfluorosilane compounds having differing carbon chains (e.g., different lengths of the carbon chain to which fluorine atoms are bonded).

Additionally or alternatively, the network of hydrolyzed silane compounds may include a fluorinated silane comprising a cyclic hydrocarbon including from 3 to 200 carbon atoms and having one or more fluorine atoms (e.g., a fluorinated cyclic hydrocarbon). For example, a cyclic hydrocarbon having one or more fluorine atoms may comprise at least about any of the following: 1, 3, 5, 8, 10, 12, 15, 20, 25, 30, 40, 50, 60, 70, 80, 90, and 100 carbon atoms and/or at most about 200, 190, 180, 170, 160, 150, 140, 130, 120, 110, 100, and 80 carbon atoms. In accordance with certain embodiments of the invention, the cyclic hydrocarbon having one or more fluorine atoms may comprise at least two (2) ring structures, such as at least about any of the following: 2, 3, 4, 5, 6, and 8 ring structures and/or at most about 20, 18, 16, 14, 12, 10, and 8 ring structures. In accordance with certain embodiments of the invention, for example, the network of hydrolyzed silane compounds may be formed from or comprise a plurality of different cyclic hydrocarbons having one or more fluorine atoms (e.g., different number of carbon atoms and/or different number of fluorine atoms).

Additionally or alternatively, the network of hydrolyzed silane compounds may include a fluorinated silane comprising a non-linear fluorinated hydrocarbon including from 3 to 120 carbon atoms, such as a dendrimer (e.g., molecules having repetitively branched structures that may or may not include cyclic rings within the molecular structure). For example, a fluorinated silane comprising a non-linear fluorinated hydrocarbon may comprise at least about any of the following: 3, 4, 5, 6, 8, 10, 12, 15, 18, 20, 25, 30, 40, 50, 60, 70, and 80 carbon atoms and/or at most about 200, 180, 160, 140, 120, 110, 100, 90, 80, and 70 carbon atoms. In accordance with certain embodiments of the invention, for example, the network of hydrolyzed silane compounds may be formed from or comprise a plurality of different non-linear fluorinated hydrocarbons (e.g., different number of carbon atoms and/or different number of fluorine atoms).

In accordance with certain embodiments of the invention, the network of hydrolyzed silane compounds may be formed or comprise fluorinated silanes, for example, as disclosed herein in which one or more of the fluorinated silanes include from about 4 to about 200 fluorine atoms, such as at least about any of the following: 4, 8, 10, 12, 15, 18, 20, 30, 40, 50, 60, 70, 80, 90, and 100 fluorine atoms and/or at most about any of the following: 200, 180, 160, 140, 120, 100, 90, 80, 70, 60, and 50 fluorine atoms. In accordance with certain embodiments of the invention, for example, the network of hydrolyzed silane compounds may be formed from or comprise a plurality of different fluorinated silanes having a different carbon-based backbone (e.g., different backbone length and/or geometry—branched, linear, cyclic, etc.) and/or a different number of fluorine atoms. (e.g., different number of carbon atoms and/or different number of fluorine atoms).

In accordance with certain embodiments of the invention, the network of hydrolyzed silane compounds may be formed or comprise one or more fluorinated silanes comprising a substituted hydrocarbon including at least one heteroatom selected from oxygen, nitrogen, sulfur, phosphorus, or combinations thereof.

The network of hydrolyzed silane compounds, in accordance with certain embodiments of the invention, may be formed from (at least in part) or comprise one or more fluorinated silanes that comprise (i) a polar head region; (ii) a fluorine-containing region or a thiol-containing region; and (iii) an anchor region that forms a bond to a substrate (e.g., inorganic substrate), in which the anchor region includes a silicon atom. In accordance with certain embodiments of the invention, the fluorine-containing region and/or thiol-containing region may be located between the polar head region and the anchor region. The fluorine-containing region, for example, may comprise any fluorinated hydrocarbon, such as those disclosed herein. For example, the fluorine-containing region may comprise a linear carbon backbone, a non-linear carbon backbone, a cyclic carbon backbone having a plurality of fluorine atoms directly or indirectly bonded thereto. The carbon backbone, for example, may be saturated or unsaturated. Additionally, or alternatively, the carbon backbone of the fluorine-containing region may include at least one heteroatom selected from oxygen, nitrogen, sulfur, phosphorus, or combinations thereof. In accordance with certain embodiments of the invention, the fluorine-containing region may comprise from about 4 to about 100 fluorine atoms, such as at least about any of the following: 4, 8, 10, 12, 15, 18, 20, 30, 40, 50, 60, 70, 80, 90, and 100 fluorine atoms and/or at most about any of the following: 200, 180, 160, 140, 120, 100, 90, 80, 70, 60, and 50 fluorine atoms. The thiol-containing region, for example, may comprise any thiol-containing hydrocarbon, such as those disclosed herein. For example, the thiol-containing region may comprise a linear carbon backbone, a non-linear carbon backbone, a cyclic carbon backbone having a plurality of thiol functional groups directly or indirectly bonded thereto. The carbon backbone, for example, may be saturated or unsaturated. Additionally, or alternatively, the carbon backbone of the thiol-containing region may include at least one heteroatom selected from oxygen, nitrogen, sulfur, phosphorus, or combinations thereof. In accordance with certain embodiments of the invention, the thiol-containing region may comprise from about 1 to about 100 thiol functional groups, such as at least about any of the following: 1, 2, 3, 4, 8, 10, 12, 15, 18, 20, 30, 40, 50, 60, 70, 80, 90, and 100 thiol functional groups and/or at most about any of the following: 200, 180, 160, 140, 120, 100, 90, 80, 70, 60, and 50 thiol functional groups.

In accordance with certain embodiments of the invention, the polar head region may comprise one or more polar functional groups to render this portion of the compound more hydrophilic. The polar head region (e.g., a hydrophilic polar head), for example, may comprise one or more of one or more of the following example functionalities: hydroxyl groups, carbonyl groups, alcohol groups, and sulfhydryl groups. The polar head region, in accordance with certain embodiments of the invention, comprises one or multiple units of ethylene glycol (EG) functionality (e.g., a polyethylene glycol (PEG) functionality). The polar head region, for example, may comprise a plurality of PEG units in a linear structure or a branched structure. In accordance with certain embodiments of the invention, the polar head region may comprise from 2 to 20 PEG units, such as at least about any of the following: 2, 3, 4, 8, 10, and 12, PEG units and/or at most about any of the following: 20, 18, 16, 15, 14, and 12 PEG units.

In accordance with certain embodiments of the invention, the anchor region that forms a bond to a substrate (e.g., inorganic substrate), in which the anchor region includes a silicon atom, may comprise one or more hydrolyzable group(s) bonded to the silicon atom. For example, the hydrolyzable group(s) may independently comprise an alkoxy group, acyloxy group, an amine group, or chlorine. For example, the hydrolyzable group(s) may be the same or different alkoxy groups, which are hydrolyzable to form reactive silanol groups that can condense with other silanol groups (e.g., from other hydrolyzed silane compounds and/ or inorganic surfaces) to form condensation products (e.g., network of hydrolyzed silane compounds). In accordance with certain embodiments of the invention, the anchor region may also include one or more heteroatom selected from oxygen, nitrogen, sulfur, phosphorus, or combinations thereof.

Figure 2:
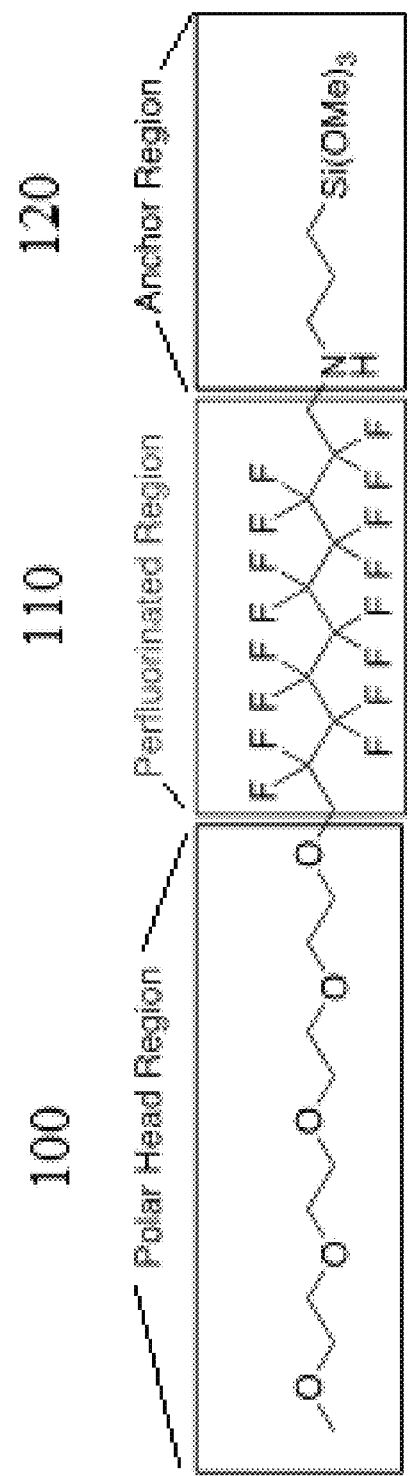
FIG. 2 illustrates a fluorinated silane including an anchor region, a fluorine-containing region, and a polar head region in accordance with one embodiment of the invention.

FIG. 2, for instance, illustrates one fluorinated silane including a polar head region 100, a fluorine-containing region 110, and an anchor region 120. For the specific fluorinated silane shown in FIG. 2, the polar head region 100 includes four (4) PEG units to impart a hydrophilic region to the fluorinate silane. The fluorine-containing region 110 comprises a perfluorinated region including 16 fluorine atoms. The anchor region 120 includes three (3) methoxy groups that can be easily hydrolyzed to form a bond with a substrate (e.g., inorganic substrate) and to form the network of hydrolyzed silanes. The anchor region 120 for this particular fluorinated silane also includes a heteroatom (i.e., nitrogen atom). It should be noted that FIG. 2 is simply an example and is not limiting.

In accordance with certain embodiments of the invention, the contaminant-sequestering coating comprises a network of hydrolyzed silane compounds include a first group of fluorinated silane compounds and a second group of fluorinated compounds, in which the first group of fluorinated silane compounds include from about 1.5 to about 10 times more fluorine atoms than the second group of fluorinated compounds. In accordance with certain embodiments of the invention, for example, the first group of fluorinated silane compounds may comprise from at least about any of the following: 1.5, 2, 3, 4, 5, and 6 times more fluorine atoms than the second group of fluorinated compounds and/or at most about any of the following: 10, 9, 8, 7, 6, and 5 times more fluorine atoms than the second group of fluorinated compounds.

In accordance with certain embodiments of the invention, the contaminant-sequestering coating comprises a network of hydrolyzed silane compounds include a first group of thiol-containing silane compounds and a second group of thiol-containing compounds, in which the first group of thiol-containing silane compounds include from about 1.5 to about 10 times more thiol groups than the second group of thiol-containing compounds. In accordance with certain embodiments of the invention, for example, the first group of thiol-containing silane compounds may comprise from at least about any of the following: 1.5, 2, 3, 4, 5, and 6 times more thiol groups than the second group of thiol-containing compounds and/or at most about any of the following: 10, 9, 8, 7, 6, and 5 times more thiol groups than the second group of thiol-containing compounds.

The contaminant-sequestering coating, in accordance with certain embodiments of the invention, may comprise network of hydrolyzed silane compounds includes a first group of fluorinated silane compounds, such as those described and disclosed herein, and a second group of thiol-functional silane compounds, such as those described and disclosed herein. For example, the network of hydrolyzed silane compounds may have a first ratio between a number of fluorine atoms to a number of thiol groups from about 100:1 to about 1:1, such as at most about any of the following: 100:1, 90:1, 80:1, 70:1, 60:1, 50:1, 40:1, and 30:1, and/or at least about any of the following: 1:1, 5:1, 10:1, 15:1, 20:1, 25:1, and 30:1. Alternatively, the network of hydrolyzed silane compounds may have a second ratio between a number of thiol groups to a number of fluorine atoms from about 100:1 to about 1:1, such as at most about any of the following: 100:1, 90:1, 80:1, 70:1, 60:1, 50:1, 40:1, and 30:1, and/or at least about any of the following: 1:1, 5:1, 10:1, 15:1, 20:1, 25:1, and 30:1. Additionally or alternatively, the network of hydrolyzed silane compounds may have a third ratio between a number of the first group of fluorinated silane compounds to a number of the second group of thiol-functional silane compounds from 20:1 to about 1:20, such as at most about any of the following: 20:1, 18:1, 15:1, 12:1, 10:1, 8:1, 5:1, 2:1, and 1:1, and/or at least about any of the following: 1:20, 1:18, 1:15, 1:12, 1:10, 1:8, 1:5, 1:2, and 1:1. In this regard, the contaminant-sequestering coating may be formed from hydrolysis of any of the aforementioned ratio of silane compounds and allowing or facilitating a condensation reaction between the hydrolyzed silane compounds. Additionally or alternatively, the plurality of hydrolyzable silane compounds may include from about 20% to about 95% by weight of the plurality of fluorinated silane compounds on a dry basis, such as at least about any of the following: 20, 35, 30, 35, 40, 45, and 50% by weight of the plurality of fluorinated silane compounds on a dry basis, and/or at most about any of the following: 95, 90, 85, 80, 75, 70, 65, 60, 55, and 50% by weight of the plurality of fluorinated silane compounds on a dry basis.

Additionally or alternatively, the contaminant-sequestering coating may include from about 10 to 100% by weight of the plurality of fluorinated silane compounds that include (a) a respective hydrophilic polar head region, wherein the respective polar head region comprises one or multiple units of ethylene glycol (EG) functionality, (b) a respective fluorine-containing region, and (c) a respective anchor region including a silicon atom, such as at least about any of the following: 10, 15, 20, 25, 30, 35, 4, 0, 45, and 50%, and/or at most about any of the following: 100, 99, 98, 95, 90, 85, 80, 75, 70, 65, 60, 55, and 50%.

In accordance with certain embodiments of the invention, the contaminant-sequestering coating sequesters one or more polyfluoroalkyl (PFAS) compounds initially present in a liquid contaminated with an initial quantity of the PFAS compounds, in which an amount of the one or more PFAS compounds sequestered comprises from about 50% to about 100% by weight of the initial quantity of the PFAS compounds and/or one or more heavy metal. In accordance with certain embodiments of the invention, for example, the contaminant-sequestering coating sequesters at least about any of the following: 50, 60, 70, 80, and 85% by weight of an initial quantity of PFAS compounds and/or one or more heavy metals in a liquid and/or at most about any of the following: 100, 99, 98, 97, 95, 90, 88, and 80% by weight of an initial quantity of PFAS compounds and/or one or more heavy metals in a liquid. In accordance with certain embodiments of the invention, the PFAS compounds comprise perfluorooctane sulfonic acid (PFOS), perfluorooctanoic acid (PFOA), or both.

In accordance with certain embodiments of the invention, the contaminant-sequestering coating sequesters one or more heavy metals initially present in a liquid contaminated with an initial quantity of the heavy metals, in which an amount of the one or more heavy metals sequestered comprises from about 50% to about 100% by weight of the initial quantity of the heavy metals. In accordance with certain embodiments of the invention, for example, the contaminant-sequestering coating sequesters at least about any of the following: 50, 60, 70, 80, and 85% by weight of an initial quantity of heavy metals in a liquid and/or at most about any of the following: 100, 99, 98, 97, 95, 90, 88, and 80% by weight of an initial quantity of heavy metals in a liquid. In accordance with certain embodiments of the invention, the heavy metals comprise mercury (Hg), cadmium (Cd), arsenic (As), chromium (Cr), thallium (Tl), lead (Pb), or any combination thereof.

In accordance with certain embodiments of the invention, the contaminant-sequestering coating may be disposed onto a variety of substrates, such as an inorganic substrate. Non-limiting examples of suitable substrates may include a variety of filtration media, such as an aluminum oxide hydroxide (γ-AlOOH) mineral. In accordance with certain embodiments of the invention, the substrate comprises a filtration medium that may comprise an aluminum oxide hydroxide (γ-AlOOH) mineral attached to micro-glass strands (e.g., an AHLSTROM DISRUPTOR® 4603 filter). In accordance with certain embodiments of the invention, the filtration medium may comprise an ultra-filter medium, a nano-filter medium, or a reverse osmosis membrane. The substrate may also comprise, for example, an ion-exchange resin. In accordance with certain embodiments of the invention, the substrate comprises an aluminum oxide hydroxide (γ-AlOOH) mineral that may sequester or bind one or more biological species, such as *Escherichia coli* (*E. Coli*) and/or virus bacteriophage MS2. In accordance with such embodiments of the invention, an initial quantity of one or more biological species may be reduced (e.g., sequester, removed, etc.) from at least about any of the following: 50, 60, 70, 80, and 85% by weight of an initial quantity of the biological species in a liquid and/or at most about any of the following: 100, 99, 98, 97, 95, 90, 88, and 80% by weight of an initial quantity of biological species in a liquid. In accordance with certain embodiments of the invention, a combination of one or more PFAS, one or more heavy metals, and one or more biological species may simultaneously be reduced (e.g., sequester, removed, etc.) from at least about any of the following: 50, 60, 70, 80, and 85% by weight of an initial quantity thereof in a liquid and/or at most about any of the following: 100, 99, 98, 97, 95, 90, 88, and 80% by weight of an initial quantity thereof in a liquid.

In another aspect, certain embodiments of the invention provide a liquid composition comprising a flowable carrier medium and a plurality of hydrolyzable silane compounds that include a plurality of thiol functional groups, a plurality of fluorinated functionalities, or both as disclosed herein. For example, the plurality of hydrolyzable silane compounds may include a plurality of thiol-functional silane compounds and a plurality of fluorinated silane compounds, such as described and disclosed herein. In accordance with certain embodiments of the invention, the plurality of fluorinated silane compounds include at least one fluorinated silane compound comprises (a) a hydrophilic polar head region, wherein the polar head region comprises one or multiple units of ethylene glycol (EG) functionality, (b) a fluorine-containing region, and (c) an anchor region including a silicon atom.

In accordance with certain embodiments of the invention, the flowable carrier medium may comprise an organic solvent, an alcohol, or an aqueous-based solvent (e.g., water). The liquid composition, for example, may comprises a solution, suspension, or colloid including a plurality of hydrolyzable silane compounds that include a plurality of thiol functional groups, a plurality of fluorinated functionalities, or both as disclosed herein. In accordance with certain embodiments of the invention, the plurality of hydrolyzable silane compounds may comprise from about 0.01% to about 20% by weight of the liquid composition, such as at least about any of the following: 0.01, 0.05, 0.1, 0.5, 1, 3, 5, 8, 10, and 12% by weight of the liquid composition and/or at most about 20, 18, 15, 12, and 10% by weight of the liquid composition. The liquid composition, for example, may be shipped to a point of use or produced on-site (i.e., a point of use) and applied to a substrate (e.g., filter media, ion exchange resin, etc.) to provide a contaminant-sequestering coating thereon.

In accordance with certain embodiments of the invention, the plurality of hydrolyzable silane compounds present in the flowable or liquid composition may have a first ratio between a number of fluorine atoms to a number of thiol groups from about 100:1 to about 1:1, such as at most about any of the following: 100:1, 90:1, 80:1, 70:1, 60:1, 50:1, 40:1, and 30:1, and/or at least about any of the following: 1:1, 5:1, 10:1, 15:1, 20:1, 25:1, and 30:1. Alternatively, the plurality of hydrolyzable silane compounds present in the flowable or liquid composition may have a second ratio between a number of thiol groups to a number of fluorine atoms from about 100:1 to about 1:1, such as at most about any of the following: 100:1, 90:1, 80:1, 70:1, 60:1, 50:1, 40:1, and 30:1, and/or at least about any of the following: 1:1, 5:1, 10:1, 15:1, 20:1, 25:1, and 30:1. Additionally or alternatively, the plurality of hydrolyzable silane compounds present in the mobile (e.g., flowable) or liquid composition may have a third ratio between a number of the first group of fluorinated silane compounds to a number of the second group of thiol-functional silane compounds from 20:1 to about 1:20, such as at most about any of the following: 20:1, 18:1, 15:1, 12:1, 10:1, 8:1, 5:1, 2:1, and 1:1, and/or at least about any of the following: 1:20, 1:18, 1:15, 1:12, 1:10, 1:8, 1:5, 1:2, and 1:1. Additionally or alternatively, the plurality of hydrolyzable silane compounds present in the flowable or liquid composition may include from about 20% to about 95% by weight of the plurality of fluorinated silane compounds on a dry basis, such as at least about any of the following: 20, 35, 30, 35, 40, 45, and 50% by weight of the plurality of fluorinated silane compounds on a dry basis, and/or at most about any of the following: 95, 90, 85, 80, 75, 70, 65, 60, 55, and 50% by weight of the plurality of fluorinated silane compounds on a dry basis. Additionally or alternatively, the plurality of hydrolyzable silane compounds present in the flowable or liquid composition may include from about 10 to 100% by weight of the plurality of fluorinated silane compounds that include (a) a respective hydrophilic polar head region, wherein the respective polar head region comprises one or multiple units of ethylene glycol (EG) functionality, (b) a respective fluorine-containing region, and (c) a respective anchor region including a silicon atom, such as at least about any of the following: 10, 15, 20, 25, 30, 35, 4, 0, 45, and 50%, and/or at most about any of the following: 100, 99, 98, 95, 90, 85, 80, 75, 70, 65, 60, 55, and 50.

In this regard, certain embodiments of the invention also provide a method of functionalizing a substrate surface with contaminant-sequestering functionalities. In accordance with certain embodiments of the invention, the method of functionalizing a substrate surface with contaminant-sequestering functionalities may include covering at least a portion or al of an inorganic substrate with a liquid composition, such as those described and disclosed herein, including a plurality of hydrolyzable silane compounds that include a plurality of thiol functional groups, a plurality of fluorinated functionalities, or both. In accordance with certain embodiments of the invention, the method may further comprise hydrolyzing the plurality of hydrolyzable silane compounds to form a plurality of hydrolyzed silane compounds and allowing (or facilitating) the hydrolyzed silane compounds to condense (e.g., condensation reaction between the plurality of hydrolyzed silane compounds) with each other to form a contaminant-sequestering coating bonded onto the inorganic substrate, in which the contaminant-sequestering coating comprises a network of the hydrolyzed silane compounds. In accordance with certain embodiments of the invention, hydrolyzing the plurality of hydrolyzable silane compounds to form a contaminant-sequestering coating on the substrate (e.g., silanization of the substrate's surface), in which the contaminant-sequestering coating comprises a network of the hydrolyzed silane compounds as disclosed herein. In accordance with certain embodiments of the invention, the substrate coated or covered with the liquid composition may include a variety of filtration media, such as an aluminum oxy-hydroxide ($\gamma$-AlOOH) mineral. In accordance with certain embodiments of the invention, the substrate may comprise a filtration medium that may comprise an $\gamma$-AlOOH mineral attached to micro-glass strands (e.g., an Ahlstrom Disruptor® 4603 filter). In accordance with certain embodiments of the invention, the filtration medium may comprise an ultra-filter medium, a nano-filter medium, or a reverse osmosis membrane. The substrate may also comprise, for example, an ion-exchange resin.

Figure 3:
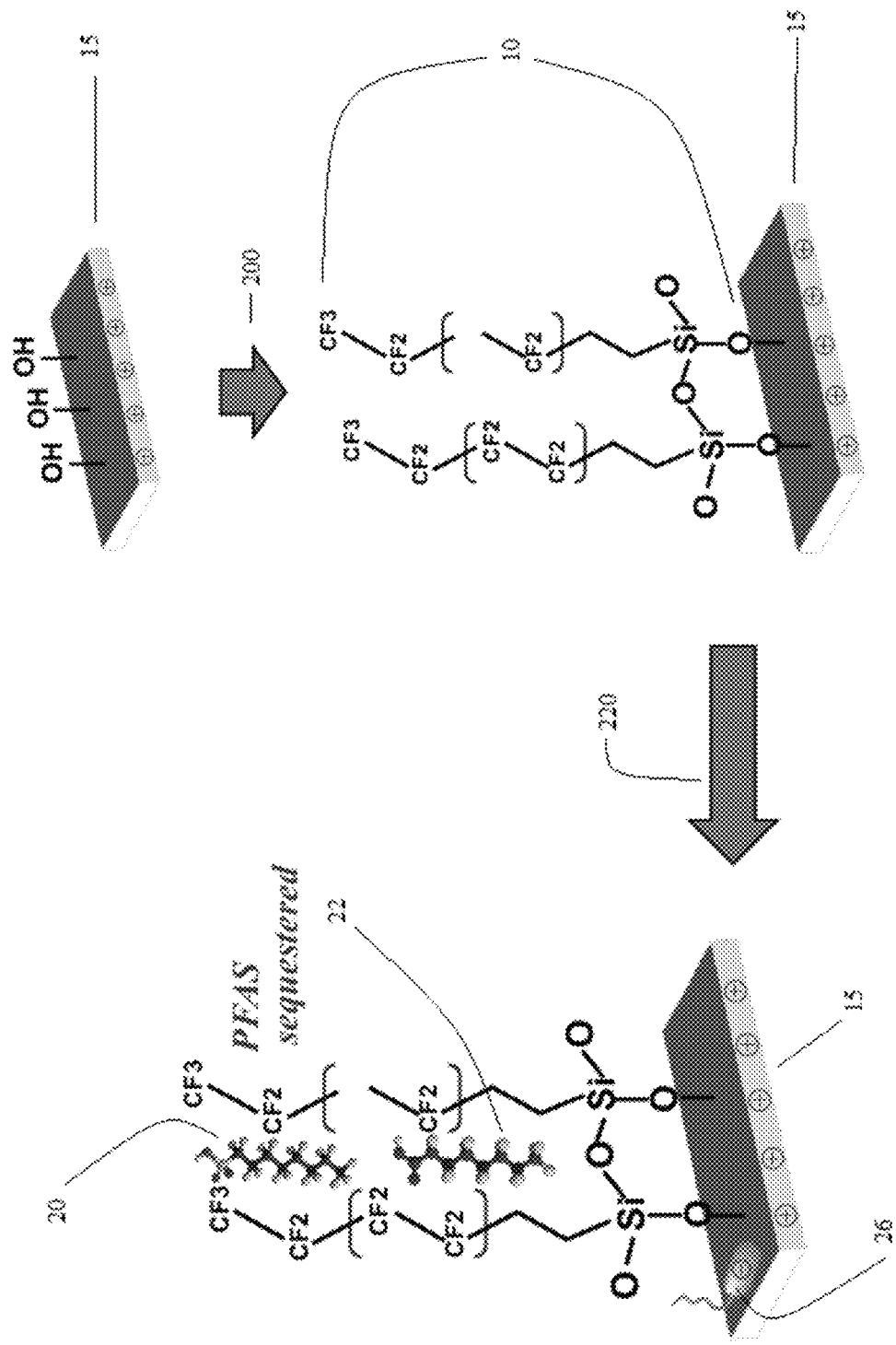
FIG. 3 illustrates a schematic for a method of functionalizing a substrate surface with contaminant-sequestering functionalities and sequestering PFAS in accordance with certain embodiments of the invention.

FIG. 3, for example, illustrates a schematic for a method of functionalizing a substrate 15 surface with contaminant-sequestering functionalities 10 (e.g., a contaminant-sequestering coating having —Si—O—Si— linkers) and sequestering PFAS 20, 22 in accordance with certain embodiments of the invention, in which the substrate comprises an aluminum oxide hydroxide ($\gamma$-AlOOH) mineral that may simultaneously sequester or binds one or more biological species 26, such as *Escherichia coli* (*E. Coli*) and/or virus bacteriophage MS2.

In accordance with certain embodiments of the invention, the step of covering a substrate (e.g., an inorganic substrate) with a liquid composition including a plurality of hydrolyzable silane compounds that include a plurality of thiol functional groups, a plurality of fluorinated functionalities, or both may comprise submerging the substrate within the liquid composition, which may be housed within a vessel or pumping the liquid composition over the surface of the substrate and/or through the thickness of the substrate (e.g., pumping the liquid composition through a filter media or through a bed of ion-exchange resin). In accordance with certain embodiments of the invention, the step of covering the substrate with the liquid composition may comprise contacting the substrate with the liquid composition for at least about 0.5 minutes to about 120 minutes, such as at least about any of the following: 0.5, 1, 5, 10, 15, 25, 30, 40, 50, 60, 70, 80, and 90 minutes and/or at most about 120, 110, 100, 90, 80, and 70 minutes.

In accordance with certain embodiments of the invention, the method of functionalizing a substrate surface with contaminant-sequestering functionalities may further comprise adding a total amount of the hydrolyzable silane compounds as disclosed herein to the flowable carrier. In accordance with certain embodiments of the invention, the hydrolyzable silane compounds may comprise from about 0.01% to about 20% by weight of the liquid composition, such as at least about any of the following: 0.01, 0.05, 0.1, 0.5, 1, 3, 5, 8, 10, and 12% by weight of the liquid composition and/or at most about 20, 18, 15, 12, and 10% by weight of the liquid composition. In accordance with certain embodiments of the invention, the step of adding the total amount of the hydrolyzable silane compounds to a flowable carrier comprises selecting the total amount of hydrolyzable silane compounds to provide at least a monolayer coverage of the surface area with the network of the hydrolyzed silane compounds.

In accordance with certain embodiments of the invention, the method of functionalizing a substrate surface with contaminant-sequestering functionalities may further comprise cleaning the substrate (e.g., inorganic substrate) prior to covering the substrate (e.g., inorganic substrate) with the liquid composition. For example, the step of washing the base surface with alcohol, acetone, toluene and the like, the step of cleaning the substrate (e.g., inorganic substrate) may comprise oxygen plasma treating the substrate prior to contacting the substrate with the liquid composition having a plurality of hydrolyzable silane compounds that include a plurality of thiol functional groups, a plurality of fluorinated functionalities, or both. Cleaning (e.g., pre-treating the surface of the substrate) the substrate may facilitate silanization of the substrate.

In another aspect, certain embodiments of the invention provide a method of removing contaminants from a contaminant-containing liquid, in which the methods include contacting the contaminant-containing liquid with a contaminant-sequestering coating. In accordance with certain embodiments of the invention, the contaminant-sequestering coating comprises a network of hydrolyzed silane compounds including a plurality of thiol functional groups, a plurality of fluorinated functionalities, or both. In accordance with certain embodiments of the invention, the contaminant-containing liquid comprises water. In accordance with certain embodiments of the invention, the contaminant-containing liquid comprises water including (i) one or more polyfluoroalkyl (PFAS) compounds, (ii) one or more heavy metals, or both (i) and (ii).

In accordance with certain embodiments of the invention, the method may comprise flowing the contaminant-containing liquid across or through a device, such as those described and disclosed herein. The device may comprise a contaminant-sequestering coating, such as those described and disclosed herein, bonded to at least a portion of a substrate (e.g., inorganic substrate). In this regard, the method further comprises contacting the contaminant-containing liquid with the contaminant-sequestering coating of the device.

In accordance with certain embodiments of the invention, the contaminant-containing liquid may be pumped across and/or through the substrate either as a single pass or multiple passes (e.g., recirculating the contaminant-containing liquid through a filter or ion-exchange bed including the contaminant-sequestering coating) until a desired reduction in PFAS and/or heavy metals is realized. In accordance with certain embodiments of the invention, the contaminant-sequestering coating sequesters from about 50% to about 100% by weight of an initial quantity of the PFAS compounds, an initial quantity of the heavy metals, or both. In accordance with certain embodiments of the invention, for example, the contaminant-sequestering coating sequesters at least about any of the following: 50, 60, 70, 80, and 85% by weight of an initial quantity of PFAS compounds in a liquid and/or at most about any of the following: 100, 99, 98, 97, 95, 90, 88, and 80% by weight of an initial quantity of PFAS compounds in a liquid. In accordance with certain embodiments of the invention, the PFAS compounds comprise perfluorooctane sulfonic acid (PFOS), perfluorooctanoic acid (PFOA), or both. In accordance with certain embodiments of the invention, for example, the contaminant-sequestering coating sequesters at least about any of the following: 50, 60, 70, 80, and 85% by weight of an initial quantity of heavy metals in a liquid and/or at most about any of the following: 100, 99, 98, 97, 95, 90, 88, and 80% by weight of an initial quantity of heavy metals in a liquid. In accordance with certain embodiments of the invention, the heavy metals comprise mercury (Hg), cadmium (Cd), arsenic (As), chromium (Cr), thallium (Tl), lead (Pb), or any combination thereof.

In accordance with certain embodiments of the invention, the method of removing contaminants from a contaminant-containing liquid comprises reducing PFOS and/or PFOA to less than about 80 parts-per-trillion (ppt), such as less than about 75 ppt, less than 70 ppt, less than 60 ppt, or less than 50 ppt.

In accordance with certain example embodiments, the step of contacting the contaminant-containing liquid with a contaminant-sequestering coating may comprise contacting the contaminant-containing liquid with a first contaminant-sequestering coating followed by contacting the contaminant-containing liquid with a second contaminant-sequestering coating. In accordance with certain embodiments of the invention, the first contaminant-sequestering coating and the second contaminant-sequestering coating are may comprise a different network of hydrolyzed silane compounds, such as those described and disclosed herein. In accordance with certain example embodiments, for example, the first contaminant-sequestering coating may be supported on a first substrate in a first unit operation (e.g., vessel or compartment) and the second contaminant-sequestering coating may be supported on a second substrate in a second unit operation (e.g., vessel or compartment). Alternatively, the first contaminant-sequestering coating and the second contaminant-sequestering coating are housed in the same unit operation (e.g., vessel or compartment, such as a mixed bed ion exchange column). The same unit operation, for example, may comprise a vessel including a first packing material and a second packing material or a filtration unit including a first filtration media including the first contaminant-sequestering coating and a second filtration media including the second contaminant-sequestering coating. The first contaminant-sequestering coating, in accordance with certain embodiments of the invention, may have a higher sequestering affinity for one or more PFAS compounds compared to the second contaminant-sequestering coating, and the second contaminant-sequestering coating may have a higher affinity for one or more heavy metals compared to the first contaminant-sequestering coating. In this regard, the first contaminant-sequestering coating may comprise a higher ratio of fluorine atoms relative to thiol groups and the second contaminant-sequestering coating may comprise a higher ratio of thiol groups relative to fluorine atoms.

In another aspect, certain embodiments of the invention provide a device including a substrate (e.g., an inorganic substrate) and a contaminant-sequestering coating bonded to at least a portion of the substrate, wherein the contaminant-sequestering coating comprises a network of hydrolyzed silane compounds including a plurality of thiol functional groups, a plurality of fluorinated functionalities, or both as described herein. In accordance with certain embodiments of the invention, the contaminant-sequestering coating may comprise a network of hydrolyzed silane compounds including (i) a plurality of fluorinated functionalities, and (ii) a plurality of thiol functional groups, and wherein the network of hydrolyzed silane compounds includes a fluorinated silane comprising (a) a hydrophilic polar head region, wherein the polar head region comprises one or multiple units of ethylene glycol (EG) functionality, (b) a fluorine-containing region, and (c) an anchor region including a silicon atom. The substrate (e.g., inorganic substrate), for example, may not be particularly limited and may include a filtration medium, nonwoven matt, nanofiltration membrane, microfiltration membrane, reverse osmosis membrane, an ion exchange resin, a structured packing material, or a random packing material (e.g., raschig rings).

In accordance with certain embodiments of the invention, the substrate may include a variety of filtration media, such as an aluminum oxide hydroxide (γ-AlOOH) mineral. In accordance with certain embodiments of the invention, the substrate may comprise a filtration medium that may comprise an aluminum oxide hydroxide (γ-AlOOH) mineral attached to micro-glass strands (e.g., an AHLSTROM DISRUPTOR® 4603 filter). In accordance with certain embodiments of the invention, the filtration medium may comprise an ultra-filter medium, a nano-filter medium, or a reverse osmosis membrane. The substrate may also comprise, for example, an ion-exchange resin. In accordance with certain embodiments of the invention, the device may comprise a housing structuring that directly or indirectly secures the substrate in a particular location or region. For example, the device may comprise a pressure vessel that secures and/or confines the substrate therein while also providing a feed inlet that allows a liquid source (e.g., a contaminant-containing liquid) and an outlet for allowing the liquid source to exit the pressure vessel after passing over and/or through the substrate, in which the contaminants (or a majority of the contaminants as disclosed herein) present within the liquid source entering the pressure vessel are sequestered via the contaminant-sequestering coating bonded to at least a portion of the substrate. In accordance with certain embodiments of the invention, the device may comprise a filter cartridge.

Examples

The present disclosure is further illustrated by the following examples, which in no way should be construed as being limiting. That is, the specific features described in the following examples are merely illustrative and not limiting.

A commercial γ-AlOOH filtration media AHLSTROM DISRUPTOR® 4603 was provided by Ahlstrom Filtration LLC (Mt Holly Springs, PA). The filter media was used without further pretreatment. Oxygen plasma treatment was accomplished using a Harrick Plasma Cleaner PDC-001. Commercial perfluorosilanes and 3-aminopropyl trimethoxysilane were obtained from Gelest Inc. (Morrisville, PA) and used in the as-received form. PFOS, PFOA, trifluorotoluene, NOVEC® 7100, and ethanol were obtained from Sigma-Aldrich (St. Louis, MO) and used without any further purification. Reagents for synthesis were obtained from Sigma-Aldrich or Oakwood Chemicals and used as received. Anhydrous solvents were purchased from Sigma-Aldrich. FILTRASORB® 300 granular activated carbon was obtained from Calgon Carbon Corporation (Moon Township, PA).

Surface Functionalization: Two functionalization procedures were developed for filter functionalization. All silane functionalization reactions were performed in plastic containers.

(1) Fluorinated Silane Functionalization: The base filter was 4603, which consists of γ-AlOOH nanowhiskers sintered onto fiberglass and forming a nonwoven filter. The effective pore size in these filters is around 1 m. All filters were subjected to an oxygen plasma treatment for 20 min. The filters were then placed in a 1% (v/v) solution of silane in trifluorotoluene with 0.1% (v/v) acetic acid and placed on a shaker table for 24 h (150 rpm). The filters were collected by vacuum filtration, washed with trifluorotoluene and isopropanol, and dried under vacuum.

(2) PEG-Fluorinated Silane Functionalization: The 4603 filters were subjected to an oxygen plasma treatment for 20 min. The filters were then placed in a 1% (v/v) solution of silane in 95% ethanol with 0.1% (v/v) acetic acid and placed on a shaker table for 24 h (150 rpm). The filters were collected by vacuum filtration, washed with ethanol, and dried under vacuum.

Water Filtration Tests: Artificial water solutions containing PFOS and PFOA were prepared with deionized water spiked with a target 860 ppt of PFOS and 390 ppt of PFOA according to the NSF method 53. The pH of the water was controlled to be around 7.5. Two types of filtration testing were performed: (a) dynamic filtration test: a filter with a diameter of 25 mm, a thickness of 0.67 mm, and an average weight of 120 mg was encapsulated inside a 25 mm filter holder made of polycarbonate. A flux of 1223 $L/m^2 \cdot h$ was selected using the recommended flow rate based on NSF protocol P248 (Military Operations Microbiological Water Purifiers) as well as NSF P473-2016 (drinking water treatment units, PFOA and PFOS). Prior to collecting the sample, the filter was flushed with the challenge water for 100 mL, and then a total of 200 mL sample was collected. The total filtration time was around 30 minutes. To avoid any cross-contamination, all testing tubing was fluorine-free. (b) Batch-mode filtration test: this test was performed by soaking three filters (the same size as used in the dynamic filtration process) in Erlenmeyer flasks containing 15,000 ppt PFOS and 8800 ppt PFOA in deionized water. The flask was then placed on a shaker table for 48 h operated at 200 rpm at room temperature. After the desired duration, the concentration of PFOS and PFOA of the water was then analyzed and the adsorption capacity was then calculated.

For relative comparison, granular activated carbon (GAC) was ground to less than 250 m in particle size to fit inside the polycarbonate filter holder. Approximately 60 mg of GAC was supported onto the 4603 base membrane for the dynamic state testing. The empty bed contact time was around 1 second using the empty bed divided by the flow rate of 10 mL/min. The bed volume after the sample collected was around 0.16 mL.

PFOS and PFOA Testing: PFOS and PFOA were analyzed using solid phase extraction (SPE) and LC/MS/MS according to the EPA method 537 version 1.1 (2009). Briefly, the C13 labeled analogs of the target compounds were added to the sample container. The container was agitated, and then the contents of the container (water sample) were passed through a solid phase extraction (SPE) cartridge with a weak anion exchange (WAX) sorbent. Once the PFAS compounds were adsorbed onto the WAX cartridge, the cartridge was eluted with the solvent and the solvent solution was reduced in volume. An aliquot of the final volume was then injected onto an LC/MS/MS operated in electrospray ionization, negative ion mode. Target analytes were then quantified off of a primary transition ion used to generate a calibration curve of relative response (target/isotope) versus concentration. The minimum reporting levels (MRLs) for PFOS and PFOA are 0.4 and 0.2 ppt, respectively.

Synthesis of PEG Silanes: Compounds 3, 4a, 4b, 5a, and 5b from Scheme 1 below were prepared according to literature procedures. Briefly, a solution of tetraethyleneglycol monomethyl ether (10.0 g, 48.0 mmol) and triethylamine (6.8 mL, 48.0 mmol) in $CH_2Cl_2$ (100 mL) was treated with p-toluenesulfonyl chloride (8.70 g, 45.6 mmol) portionwise at 20° C. under nitrogen. The resulting reaction mixture was stirred for 16 h at 20° C. The reaction was diluted with water (200 mL), and the aqueous layer was extracted with $CH_2Cl_2$ (150 mL×2). The combined organic fractions were dried (MgSO$_4$) and concentrated under reduced pressure to yield tosylate 3 (15.2 g, 41.9 mmol, 87%) as a colorless oil. HNMR (400 MHz; CDCl$_3$): δ 7.80 (d, J=8.2 Hz, 2H), 7.34 (d, J=8.0 Hz, 2H), 4.16 (t, J=4.8 Hz, 2H), 3.68 (t, J=4.9 Hz, 4H), 3.63 (t, J=4.5 Hz, 8H), 3.58 (s, 5H), 3.54 (t, J=4.6 Hz, 3H), 3.37 (s, 3H), 2.45 (s, 3H).

General Procedure for the Alkylation of Fluorinated Diols: A solution of diol 4a-c from Scheme 1 below (14.5 mmol) in dry dioxane (50 mL) was treated with sodium hydride (60% dispersion in mineral oil, 10.4 mmol) under nitrogen, stirred for 30 min at room temperature, and warmed to 90° C. for 2 h. A solution of tosylate 3 (6.90 mmol) in dry dioxane (19 mL) was added dropwise and the mixture was stirred at 90° C. overnight. The reaction was cooled down to room temperature and quenched with 1 M HCl (2 mL), and the solvent was removed under reduced pressure. The crude compound was dissolved in dichloromethane (200 mL), and a white precipitate was removed via filtration. After solvent removal, the crude product was purified by chromatography on SiO$_2$ (2:1 ethyl acetate/hexanes) to yield 5a-c from Scheme 1 as the monosubstituted alcohols.

16,16,17,17,18,18,19,19,20,20,21,21,22,22,23,23-Hexade-cafluoro-2,5,8,11,14-pentaoxatetracosan-24-ol (5c from Scheme 1). H NMR (400 MHz; CDCl$_3$): δ 4.13-3.99 (m, 4H), 3.79-3.77 (m, 2H), 3.66 (q, J=7.7 Hz, 12H), 3.56-3.52 (m, 2H), 3.38 (s, 3H); 19F NMR (376 MHz, CDCl$_3$): δ=−123.5 (s), −122.4, −122.0, −119.8.

General Procedure for Triflation and Aminolysis of Alcohols: A solution of PEG-fluorinated alcohol 5a-c from Scheme 1 (2.41 mmol) in dry THF (5 mL) was cooled to 0° C. and treated with trifluoromethane sulfonyl chloride (4.83 mmol) followed by triethylamine (6.03 mmol) under a N2 atmosphere. The reaction was stirred for 30 min at 0° C. and allowed to warm to room temperature overnight, diluted with EtOAc, and washed with water. The organic extract was dried (MgSO$_4$), filtered, and concentrated in vacuo to give the crude product. The crude product was purified by chromatography on SiO2 (1:1 to 4:1 ethyl acetate/hexanes) to give the intermediate triflate as a tan, oily liquid. The intermediate triflate (2.41 mmol) was dissolved in 3-aminopropyltrimethoxy silane (7.25 mmol) and heated to 50° C. overnight. The reaction was concentrated to a viscous oil, and silanes 1a-c were carried on directly for the functionalization of the membranes.

Results

In these examples, γ-AlOOH filtration media was used and investigated for the feasibility of fluorinated surface functionalization for PFOS and PFOA removal from contaminated water. The γ-AlOOH substrate was chosen due to its high specific surface area as well as its surface characteristics upon contact with water. That is, in aqueous solutions, the aluminol group on γ-AlOOH leads to the formation of (Al(OH))$^{2+}$. As a result, γ-AlOOH carries a high level of positive charge and is commonly used to sequester negatively charged microbes from water. In accordance with certain embodiments of the invention, therefore, a multifunctional filtration media that can simultaneously remove toxic heavy metal ions, biological species, and PFOS/PFOA from water is provided.

The initial approach for the removal of PFOA and PFOS was based on the theory, to which we do not wish to be bound, that the perfluorinated side chains, for example, would have a favorable fluorophilic C—F . . . F—C interaction and adsorb onto a surface functionalized with perfluorinated chains as illustrated in FIG. 1. Using commercial perfluorinated silanes, 4603 filters were functionalized and tested for the removal of PFOA and PFOS. The silanes utilized to functionalize the 4603 filters were (tridecafluoro-1,1,2,2-tetrahydrooctyl) trimethoxysilane (F13), (heptadecafluoro-1,1,2,2-tetrahydrodecyl) trimethoxy-silane (F17), and (perfluoro(polypropyleneoxy))-methyoxypropyl trimethoxysilane (F133-283). Structures for (tridecafluoro-1,1,2,2-tetrahydrooctyl) trimethoxysilane (F13), (heptadecafluoro-1,1,2,2-tetrahydrodecyl) trimethoxy-silane (F17), and (perfluoro(polypropyleneoxy))-methyoxypropyl trimethoxysilane (F133-283) are shown below:

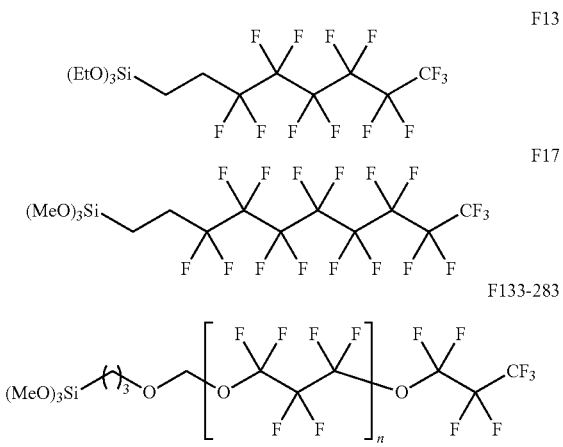

Several functionalization conditions for the functionalization of 4603 filters with fluorinated silanes include solvents, temperatures, and reaction times. One set of functionalization conditions (95% EtOH, cat. AcOH) resulted in filters that performed poorly on these substrates, presumably due to the aggregation of the silanes in solution, which prevented efficient functionalization of the substrate. As perfluorinated compounds are often soluble in fluorinated solvents, we tested trifluoroethanol, trifluorotoluene (TFT), and NOVEC® 7700 for filter conjugation and found that using TFT as the solvent yielded filters with the highest removal of PFOA and PFOS. Functionalization using NOVEC® 7700 yielded filters with the second best removal.

A silane concentration screen of the F17-functionalized filters was tested under dynamic filtration conditions at silane concentrations of 0.1, 0.5, and 1%, and the results are shown in Table 1 below. PFAS removal improved with increasing silane concentration but also resulted in a large pressure drop. This is most likely due to the increased hydrophobicity of the filters.

TABLE 1

Dynamic Filtration using Silanes

| samples | silane loading (%) | total PFOS/PFOA (ppt) | PFOS (ppt) | PFOA (ppt) | pressure drop (psi) |
|---|---|---|---|---|---|
| challenge water | N/A | 1250 | 860 | 390 | |
| 4603 control | 0 | 239 | 29 | 210 | 1.0 |
| F13 on 4603 | 1.0 | 96 | <MRL | 96 | 1.2 |
| F17 on 4603 | 0.1 | 86 | 1 | 85 | 1.3 |
| F17 on 4603 | 0.5 | 16 | <MRL | 16 | 2.9 |
| F17 on 4603 | 1.0 | 3 | 1 | 2 | 4.6 |
| GAC on 4603 | 0 | 167 | 47 | 120 | 0.6 |

These fluorinated silane-modified filters performed better than a filter loaded with a cake layer of granular activated carbon (GAC) FILTRASORB® 300. Compared to the F13 silanized filter, the F17 silanized filter displayed almost quantitative removal at a similar silane loading. Note that the higher performance of the fluorinated silane-modified filters in this test may have been due to faster kinetics rather than higher capacity since the empty bed contact time of 1s is less than the typical GAC empty bed contact time for PFAS (>10 min).

Subsequently, improving the filter performance was achieved by reducing the back pressure under increased flux. The highly fluorinated surface produced high back pressure and negatively impacted filtration efficiency. It was hypothesized that a silane containing a polar, for example, poly(ethylene glycol) (PEG) terminus (i.e., polar head region previously discussed herein) and a perfluorinated region would effectively reduce any associated pressure drop while maintaining the effective removal of PFAS. The structure of this amphiphilic silane is shown in FIG. 2.

A series of silanes with varied perfluorinated chains were prepared according to Scheme 1. The MPEG-4-OH (2) was activated using tosyl chloride. The diol (4a-c from Scheme 1) was deprotonated using sodium hydride and alkylated with the tosylate (3 from Scheme 1) to provide alcohol (5a-c from Scheme 1) in modest yields. Alcohols 5a-c from Scheme 1 were activated as the triflate using trifluoromethane sulfonyl chloride and displaced with 3-aminopropyl trimethoxysilane at 50° C. to give the desired products (1a-c from Scheme 1) in good yields. Analogs were prepared with 4-, 6-, and 8-perfluorinated carbons giving 8, 12, and 16 fluorines, respectively. Compounds 1a-1c from Scheme 1 were used directly for the filter conjugation reaction without further purification. Interestingly, these products were soluble under our initial conjugation conditions (95% EtOH, cat. AcOH) and did not require the use of fluorinated solvents.

Beneficially, the PEG-substituted fluorosilanes proved highly effective in removing PFOA and PFOS with no increase in pressure drop as shown in Table 2 below. Overall, the PEG silanes with fluorination lengths of F8-F16 were highly effective in removing PFOS/PFOA with the F16-PEG silane (1c) performing the best overall.

TABLE 2

| PFAS Removal under Dynamic Conditions | | | | | |
|---|---|---|---|---|---|
| samples | silane loading (%) | total PFOS/ PFOA (ppt) | PFOS (ppt) | PFOA (ppt) | pressure drop (psi) |
| challenge | N/A | 1250 | 860 | 390 | |
| 4603 control | 0 | 239 | 29 | 210 | 1.0 |
| F17 on 4603 | 1.0 | 3 | 1 | 2 | 4.6 |
| 1a on 4603 | 1.0 | 91 | 2 | 89 | 0.8 |
| 1b on 4603 | 1.0 | 0.7 | 0 | 0.7 | 1.0 |
| 1c on 4603 | 1.0 | 0.4 | 0 | 0.4 | 0.6 |

Batch-Mode Adsorption for PFOA and PFOS: A static batch-mode adsorption experiment was performed at 25° C. with PFOA and PFOS challenge solutions and the 4603 control, F17-functionalized 4603, and 1c-functionalized 4603 (F16-4PEG), using a challenge solution with 15,000 ppt PFOS and, 8800 ppt of PFOA. The total time of the experiment was controlled to be 48 h. The results are shown in Table 3 below. Functionalization with silane 1c resulted in the highest adsorption of PFOA under the batch-mode

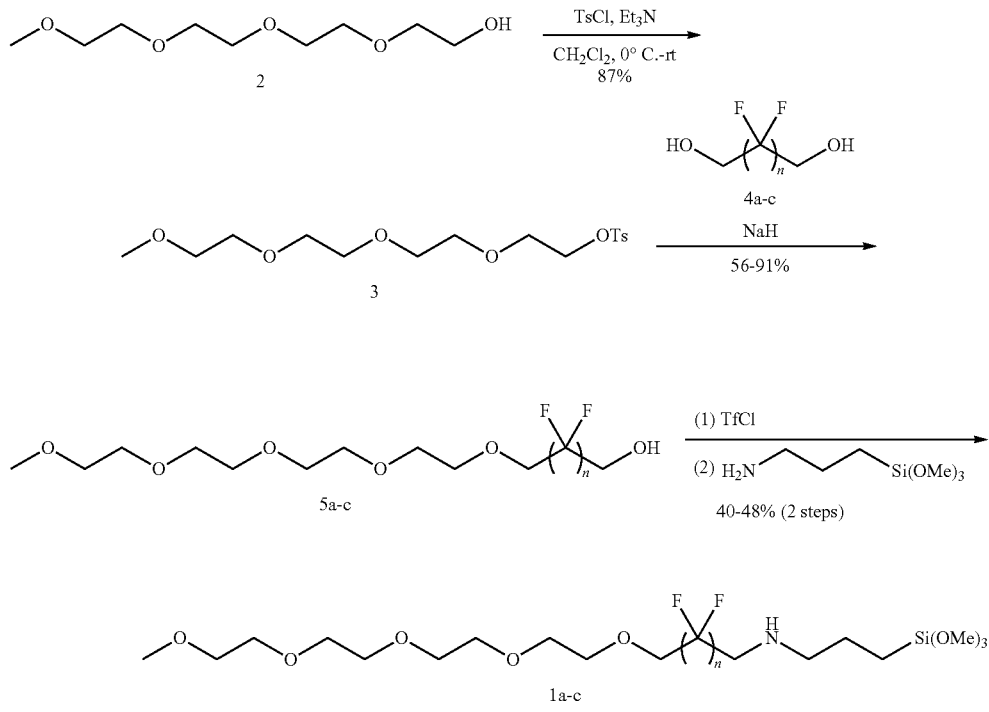

Scheme 1: Synthesis of PEG-4 Fluorosilanes 1a, n = 4  1b, n = 6  1c, n = 8 conditions, and the F17 had the highest adsorption of PFOS with almost complete removal from the challenge solution. The high adsorption capacity of PFOS is believed to be due to the extra fluorine atoms, which can lead to more fluorine-fluorine interactions, and the results are consistent with our molecular dynamic (MD) simulation. Preliminary data suggests that adsorbed PFOS and PFOA do not leach out of used filters when flushed with deionized water,

TABLE 3

Static Adsorption of PFOA and PFOS

| samples | PFOS adsorption capacity (ng/mg) | PFOA adsorption capacity (ng/ml) | PFOS adsorption capacity increase over 4603 control (%) | PFOA adsorption capacity increase over 4603 control (%) |
|---|---|---|---|---|
| 4603 | 3124 | 15 | | |
| F17 | 12 565 | 57 | 302 | 280 |
| F16-4PEG | 9963 | 148 | 219 | 887 |

Filters functionalized with commercial fluorinated silanes proved highly effective at removing PFAS contaminants from the challenge water, however, resulting in a large pressure drop. To improve the performance of these filters, a series of modified amphiphilic silanes were synthesized and evaluated under dynamic and static filtration conditions. Beneficially, these silanes provided excellent PFAS removal with no increased pressure drop. The amphiphilic silanes have a high capacity for PFAS removal under static adsorption conditions.

Additional PFAS Removal Study: An additional set of studies were performed under dynamic flow conditions in the manner disclosed above, in which the flow rate was 10 ml/min with a flux of 1223 L/hr*m² at 23° C. In this regard, a challenge solution containing 1000 ppt of PFOS and 500 ppt of PFOA was utilized for testing of a variety of filters and functionalized filters. The control was a 4603 base filter, which consists of γ-AlOOH nanowhiskers sintered onto fiberglass and forming a nonwoven filter. The effective pore size in these filters is around 1 m. An additional comparative test included loading approximately 60 mg of GAC supported onto the 4603 base membrane for the dynamic state testing. A 4603 filter was functionalized with a F17 silane, in accordance with certain embodiments of the invention, with the following structure and tested:

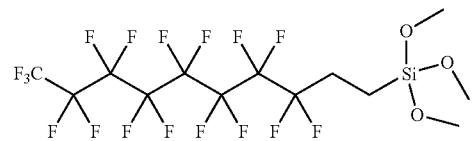
F17

Also tested was a 4603 filter was functionalized with a F16-4PEG silane, in accordance with certain embodiments of the invention, with the following structure and tested:

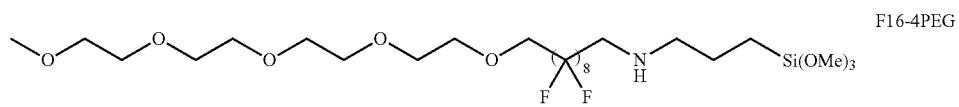
F16-4PEG

The results are shown in Table 4 below.

TABLE 4

Additional PFAS Removal under Dynamic Conditions

| samples | PFOS (ppt) | PFOA (ppt) | PFOS Removal (%) | PFOA Removal (%) | Pressure Drop (psi) |
|---|---|---|---|---|---|
| challenge | 1000 | 500 | NA | NA | |
| 4603 control | 310 | 365 | 69 | 27 | 0.5 |
| F17 on 4603 | 0 | 4 | 100 | 98.6 | 4.2 |
| F16-4PEG: 4603 | 0 | 0.7 | 100 | 99.9 | 0.6 |
| GAC F300 | 47 | 120 | 90 | 94 | 1.0 |

As shown in Table 4, the functionalized filters in accordance with certain embodiments of the invention effectively sequestered all of the PFOA and the PFOS in the challenge water, while the fluorinated-silane including the polar head region provided a pressure drop similar to or less than traditional filtering technologies that fail to provide the level of PFOA and PFOS sequestering.

These and other modifications and variations to the invention may be practiced by those of ordinary skill in the art without departing from the spirit and scope of the invention, which is more particularly set forth in the appended claims. Specifically, for example, it should be understood that additional example embodiments include a method of removing contaminants from a contaminant-containing liquid, where the method includes contacting the contaminant-containing liquid with a contaminant-sequestering coating, where the contaminant-sequestering coating includes a network of hydrolyzed silane compounds including a plurality of thiol functional groups, a plurality of fluorinated functionalities, or both. Moreover, in the foregoing additional example embodiment, the contaminant-containing liquid may include water that includes: (i) one or more polyfluoroalkyl (PFAS) compounds: (ii) one or more heavy metals; (iii) biological species; or (iv) any combination of (i), (ii) and (iii). Even further, the contaminant-sequestering coating may sequester from about 50% to about 100% by weight of: (i) an initial quantity of the PFAS compounds; (ii) an initial quantity of the heavy metals; (iii) an initial quantity of biological species; or (iv) any combination of (i), (ii), and (iii). Yet another example embodiment includes a device, which includes a substrate and a contaminant-sequestering coating bonded to at least a portion of the substrate, where the contaminant-sequestering coating includes a network of hydrolyzed silane compounds including a plurality of thiol functional groups, a plurality of fluorinated functionalities, or both, and further where the substrate includes a filtration medium or an ion-exchange resin.

In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A contaminant-sequestering coating, comprising a network of hydrolyzed silane compounds including (i) a plurality of fluorinated functionalities, and (ii) a plurality of thiol functional groups, wherein the network of hydrolyzed silane compounds includes a first group of fluorinated silane compounds and a second group of thiol-functional silane compounds, wherein the network of hydrolyzed silane compounds includes a fluorinated silane comprising (a) a hydrophilic polar head region, wherein the polar head region comprises one or multiple units of ethylene glycol (EG) functionality, (b) a fluorine-containing region, and (c) an anchor region including a silicon atom.

2. The contaminant-sequestering coating of claim 1, wherein the network of hydrolyzed silane compounds includes a thiol-functional silane including at least one alkoxy group bonded to a silicon atom.

3. The contaminant-sequestering coating of claim 2, wherein the thiol-functional silane has a structure according to Formula (1):

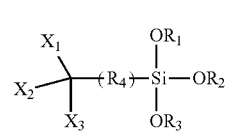

Formula (I)

wherein
—$R_1$, —$R_2$, and —$R_3$ are each a $C_1$-$C_4$ radical,
$R_4$ is a saturated $C_1$-$C_{20}$ radical or an unsaturated $C_1$-$C_{20}$ radical,
$X_1$, $X_2$, and $X_3$ are each independently selected from —H or —SH, and wherein at least one of $X_1$, $X_2$, and $X_3$ is —SH.

4. The contaminant-sequestering coating of claim 3, wherein $R_4$ includes at least one side chain including one or more thiol functionalities thereon.

5. The contaminant-sequestering coating of claim 3, wherein $R_4$, includes at least one heteroatom selected from oxygen, nitrogen, sulfur, phosphorus, or combinations thereof.

6. The contaminant-sequestering coating of claim 1, wherein the fluorinated silane comprises a linear $C_1$-$C_{40}$ perfluorosilane.

7. The contaminant-sequestering coating of claim 1, wherein the network of hydrolyzed silane compounds includes a first group of fluorinated silane compounds and a second group of fluorinated compounds, and wherein the first group of fluorinated silane compounds includes from about 1.5 to about 5 times more fluorine atoms than the second group of fluorinated compounds.

8. The contaminant-sequestering coating of claim 1, wherein the network of hydrolyzed silane compounds has a first ratio between a number or fluorine atoms to a number of thiol groups from about 50:1 to about 1:1.

9. The contaminant-sequestering coating of claim 1, wherein the contaminant-sequestering coating sequesters:
(i) one or more polyfluoroalkyl (PFAS) compounds initially present in a liquid contaminated with an initial quantity of the PFAS compounds, wherein an amount of the one or more PFAS compounds sequestered comprises from about 50% to about 100% by weight of the initial quantity of the PFAS compounds;
(ii) one or more heavy metals initially present in a liquid contaminated with an initial quantity of the heavy metals, wherein an amount of the one or more heavy metals sequestered comprises from about 50% to about 100% by weight of the initial quantity of the heavy metals; or
(iii) both (i) and (ii).

10. A method of functionalizing a substrate surface with contaminant-sequestering functionalities, the method comprising:
(A) covering an inorganic substrate with a liquid composition, the liquid composition comprising (i) a flowable carrier medium; and (ii) a plurality of hydrolyzable silane compounds including a plurality of thiol-functional silane compounds and a plurality of fluorinated silane compounds; wherein the plurality of fluorinated silane compounds comprises (a) a hydrophilic polar head region, wherein the polar head region comprises one or multiple units of ethylene glycol (EG) functionality, (b) a fluorine-containing region, and (c) an anchor region including a silicon atom; and
(B) hydrolyzing the plurality of hydrolyzable silane compounds to form a plurality of hydrolyzed silane compounds and allowing the hydrolyzed silane compounds to condense with each other to form a contaminant-sequestering coating bonded onto the inorganic substrate; wherein the contaminant-sequestering coating comprises a network of the hydrolyzed silane compounds.

11. The method of claim 10, wherein about 10 to 100% by weight of the plurality of fluorinated silane compounds include (a) a respective hydrophilic polar head region, wherein the respective polar head region comprises one or multiple units of ethylene glycol (EG) functionality, (b) a respective fluorine-containing region, and (c) a respective anchor region including a silicon atom.

12. The method of claim 10, wherein the plurality of hydrolyzable silane compounds includes from about 20% to about 95% by weight of the plurality of fluorinated silane compounds on a dry basis.

13. A device comprising:
an inorganic substrate; and
a contaminant-sequestering coating bonded to at least a portion of the inorganic substrate,
wherein the contaminant-sequestering coating in a dry and/or solid state comprises a network of hydrolyzed silane compounds including (i) a plurality of fluorinated functionalities, and (ii) a plurality of thiol functional groups, and
wherein the network of hydrolyzed silane compounds includes a fluorinated silane comprising (a) a hydrophilic polar head region, wherein the polar head region comprises one or multiple units of ethylene glycol (EG) functionality, (b) a fluorine-containing region, and (c) an anchor region including a silicon atom.

14. The device of claim 13, wherein the inorganic substrate comprises a filtration medium, an ion exchange resin, a structured packing material, or a random packing material.

15. A method of removing contaminants from a contaminant-containing liquid, the method comprising:
flowing the contaminant-containing liquid across or through a device, the device comprising:
an inorganic substrate; and
a contaminant-sequestering coating bonded to at least a portion of the inorganic substrate,
wherein the contaminant-sequestering coating in a dry and/or solid state comprises a network of hydrolyzed silane compounds including (i) a plurality of fluorinated functionalities, and (ii) a plurality of thiol functional groups, and
wherein the network of hydrolyzed silane compounds includes a fluorinated silane comprising (a) a hydrophilic polar head region, wherein the polar head region comprises one or multiple units of ethylene glycol (EG) functionality, (b) a fluorine-containing region, and (c) an anchor region including a silicon atom; and
contacting the contaminant-containing liquid with the contaminant-sequestering coating.

16. The method of claim 15, wherein the contaminant-containing liquid comprises water.

17. The method of claim 15, wherein contacting the contaminant-containing liquid with the contaminant-sequestering coating comprises flowing the contaminant-containing liquid across or through the device until the contaminant-sequestering coating sequesters (i) from about 50% to about 100% by weight of an initial quantity of one or more polyfluoroalkyl (PFAS) compounds initially present in the contaminant-containing liquid, (ii) from about 50% to about 100% by weight of an initial quantity of one or more heavy metals initially present in contaminant-containing liquid, or (iii) both (i) and (ii).

18. The method of claim 17, wherein contacting the contaminant-containing liquid with the contaminant-sequestering coating comprises recirculating the contaminant-containing liquid across or through the device until the contaminant-sequestering coating sequesters (i) from about 50% to about 100% by weight of an initial quantity of one or more PFAS compounds initially present in the contaminant-containing liquid, (ii) from about 50% to about 100% by weight of an initial quantity of one or more heavy metals initially present in contaminant-containing liquid, or (iii) both (i) and (ii).

* * * * *